(12) United States Patent
Cruickshank et al.

(10) Patent No.: US 6,397,182 B1
(45) Date of Patent: May 28, 2002

(54) METHOD AND SYSTEM FOR GENERATING A SPEECH RECOGNITION DICTIONARY BASED ON GREETING RECORDINGS IN A VOICE MESSAGING SYSTEM

(75) Inventors: Brian Cruickshank, Oakville; Pierre M. Forgues, Greenfield Park; Lin Lin, Toronto, all of (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/414,855

(22) Filed: Oct. 12, 1999

(51) Int. Cl.[7] .................. G10L 15/14; G10L 15/28; G06F 17/20; H04M 1/66
(52) U.S. Cl. ............... 704/256; 704/273; 379/913; 379/902; 379/907
(58) Field of Search .................. 704/251, 270, 704/270.1, 275, 273, 8, 231; 379/913, 902, 907

(56) References Cited

U.S. PATENT DOCUMENTS

| | | | | |
|---|---|---|---|---|
| 5,822,405 A | * | 10/1998 | Astarabadi | 704/270.1 |
| 5,892,814 A | * | 4/1999 | Brisebois | 379/88.24 |
| 5,894,504 A | * | 4/1999 | Alfred et al. | 379/88.13 |
| 5,991,723 A | * | 11/1999 | Duffin | 704/260 |

OTHER PUBLICATIONS

Elvira J M Et Al: "Name dialing using final user defined vocabularies in mobile (GSM and TACS) and fixed telephone networks" Proceedings of the 1998 IEEE International Conference On Acoustics, Speech and Signal Processing, ICASSP '98 (CAT. No. 98CH36181), Seattle, WA, USA, 12–1, pp. 849–852 vol. 2, XP002164537 1998, New York, NY, USA, IEEE, USA ISBN: 0–7803–4428–6.

Ramabhadran B Et Al: "Acoustics–Only Based Automatic Phonetic Baseform Generation" Seattle, WA, May 12–15, 1998, New York, NY: IEEE, US, vol. Conf. 23, May 12, 1998, pp. 309–312, XP000854577 ISBN: 0–7803–4429–4.

Deshmukh N Et Al: "Automated generation of N–best pronunciations of proper nouns" 1996 IEEE International Conference on Acoustics, Speech, and Signal Processing Conference Proceedings (CAT. NO.96CH35903), Atlanta, GA,USA,7–10M, pp. 283–286, vol. 1, XP002164538 1996, New York, NY, USA, IEEE, USA ISBN: 0–7803–3192–3.

Cucchiarelli A Et Al: "A statistical technique for bootstrapping available resources for proper nouns classification" Proceedings 1999 International Conference On Information Intelligence and Systems (CAT. No.PR00446), Bethesda, MD, USA, Oct. 31–Nov. 3, 1999, pp. 429–435, XP002164539 1999, Los Alamitos, CA, USA, IEEE Comput. Soc, USA ISBN: 0–7695–0446–9.

Search report for European application No. 00650132.4–2218–.

* cited by examiner

Primary Examiner—Richemond Dorvil
Assistant Examiner—Daniel A. Nolan (57) ABSTRACT

A system and a method for generating a speech recognition dictionary that can be used in a telephone system having speech recognition capabilities, in particular capabilities to effect a connection when the calling party utters the name of a subscriber (called party). The method generates transcriptions associated to respective vocabulary items in the speech recognition dictionary from audio greetings recorded by the telephone system subscribers. Normally such audio greetings are used in voice messaging applications. Typically, the greetings are played before allowing callers to leave messages in a voice mailbox of subscribers. An individual greeting is audio information that contains the name of the subscriber. This audio information is processed to generate a transcription associated to a vocabulary item in the speech recognition dictionary, representative of the subscriber name.

16 Claims, 5 Drawing Sheets

METHOD AND SYSTEM FOR GENERATING A SPEECH RECOGNITION DICTIONARY BASED ON GREETING RECORDINGS IN A VOICE MESSAGING SYSTEM

FIELD OF THE INVENTION

The invention relates to a method and a system for generating a speech recognition dictionary based on greeting recordings in a voice messaging system. The invention finds practical applications in telephone systems, such as Private Branch Exchange (PBX) systems, also called "Key systems" that have a voice messaging capability and also speech recognition functions, such as the ability to connect a caller to a subscriber of the telephone system (called party) by recognizing the name of the subscriber uttered by the calling party.

BACKGROUND OF THE INVENTION

Modern telephony brings to consumers a broad range of enhanced functions above the basic telephone service such as the ability to establish a communication link between taco remote locations in a network. Specific examples of such enhanced call-related functions include speech recognition, and voice messaging, among many others. An example of speech recognition services that are available today is the ability of a telephone system, such a PBX system, to effect a connection when the caller utters the name of the subscriber he/she wishes to call. The telephone system uses a speech recognition unit which processes the signal derived from the spoken utterance and tries to match this utterance to vocabulary items in a speech recognition dictionary. The vocabulary items in the speech recognition dictionary are representations of the names of the subscribers serviced by the telephone system. When the speech recognition unit finds the best match to the spoken utterance, the connection with the subscriber associated with the chosen vocabulary item is effected either immediately or after completion of a confirmation dialogue with the caller.

During the commissioning phase of the telephone system, the speech recognition dictionary is built. Typically, a text-to-transcription unit processes orthographic representations of vocabulary items associated to respective subscriber names. For each vocabulary item, the text-to-transcription unit outputs at least one transcription indicative of the pronunciation of the vocabulary item. Each transcription is comprised of a plurality of sub-word units, each sub-word unit being associated to a respective speech model. Typically, a speaker independent model set trained on the basis of a plurality of speakers is used.

A deficiency of the above-described method is that variations in pronunciations of the subscriber names are not usually provided by the text-to-transcription unit. This problem is particularly noticeable when a subscriber's name is in a language of origin different than that supported by the text-to-transcription unit. In such situations, the pronunciation derived by the text-to-transcription unit may not properly describe the actual pronunciation of the subscriber name. Consequently, the recognition performance for such name is poor.

Against this background it is clearly apparent that there exists a need in the industry to provide an improved method and a system to generate a speech recognition dictionary particularly, for use in the context of telephone systems that offer speech recognition services to users.

SUMMARY OF THE INVENTION

The invention provides a system and a method for generating a speech recognition dictionary by making use of the audio greetings recorded by telephone system subscribers. The audio greetings are played before allowing callers to leave messages in a voice mailbox of subscribers. An individual greeting is audio information that contains the name of the subscriber. This audio information can be processed to generate a transcription indicative of a pronunciation of a vocabulary item in a speech recognition dictionary representative of the subscriber name.

In a specific example of implementation, the individual greeting is an identification message consisting essentially of a signal representative of the name of the subscriber.

Advantageously, using an individual greeting to generate a transcription associated to a vocabulary item allows the speech recognition dictionary to capture a pronunciation of the subscriber name as he would pronounce himself.

In a specific example of implementation, the telephone system is a PBX system including a speech recognition unit capable to effect a connection when a caller utters the name of the called party (subscriber). The speech recognition process is effected based on the speech recognition dictionary containing the vocabulary items representative of the subscriber names, which have been generated from the individual greetings. As a variant, the vocabulary items are further associated to alternative pronunciations of the vocabulary items derived on a basis of the orthographic representation of the subscriber name as well as text to phoneme rules.

The present invention allows the generation of a speech recognition dictionary when the individual greetings are available.

The invention also extends to a telephone system with voice messaging capability that can generate a speech recognition dictionary from the audio greetings of the subscribers.

DETAILED DESCRIPTION

Figure 1:
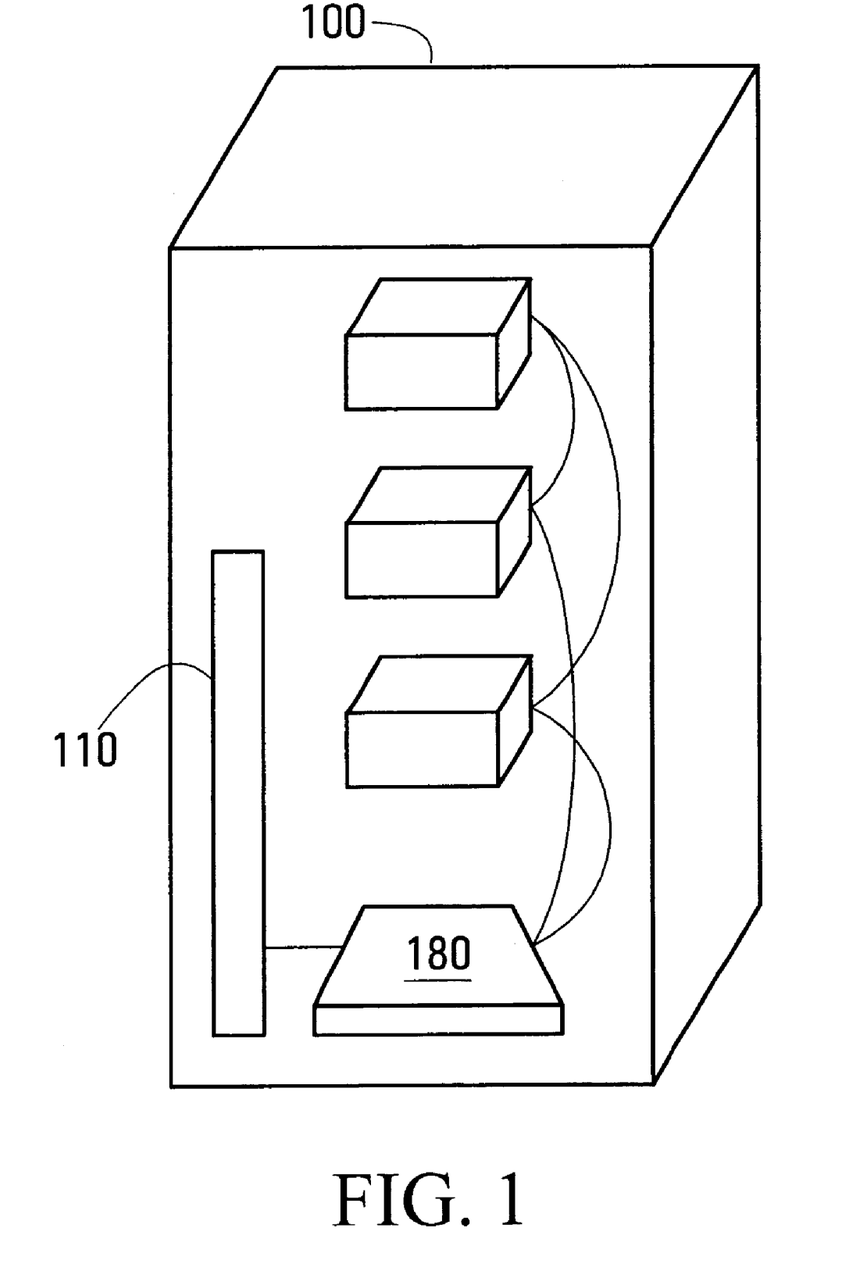
FIG. 1 is a schematic view of a computing apparatus that implementing the functionality of a PBX telephone system in accordance with the present invention.

With reference to the specific example of implementation of the invention depicted in FIG. 1, the device shown therein is a PBX telephone system 100 having a voice messaging capability and also offering speech recognition services, capable to effect a connection when a caller utters the name of the called party (subscriber). The PBX telephone system 100 includes two main components namely a computing apparatus in the form of a server and an adapter card 180 connected to the bus on the mother board 110 of the server as it will be described in greater detail later. In a specific example, the adapter card 180 is designed to be plugged in a free expansion slot on the motherboard to connect to the bus. FIG. 1 also illustrates a plurality of boxes above the adapter card 180. These are shown for completion purposes and represent the usual components found in a server, such as power supply, hard drives, tape drives, floppy drives and so on. These components are available as off-the shelf components and for this purpose they will not be described in detail here.

Briefly stated, the adapter card 180 provides the core telephony functions and also a DSP resource to program elements executed by the server that provide call-related functions. Such DSP resource offers one or more DSP services, such as voice encoding, voice decoding, speech recognition processing and so on.

Figure 2:
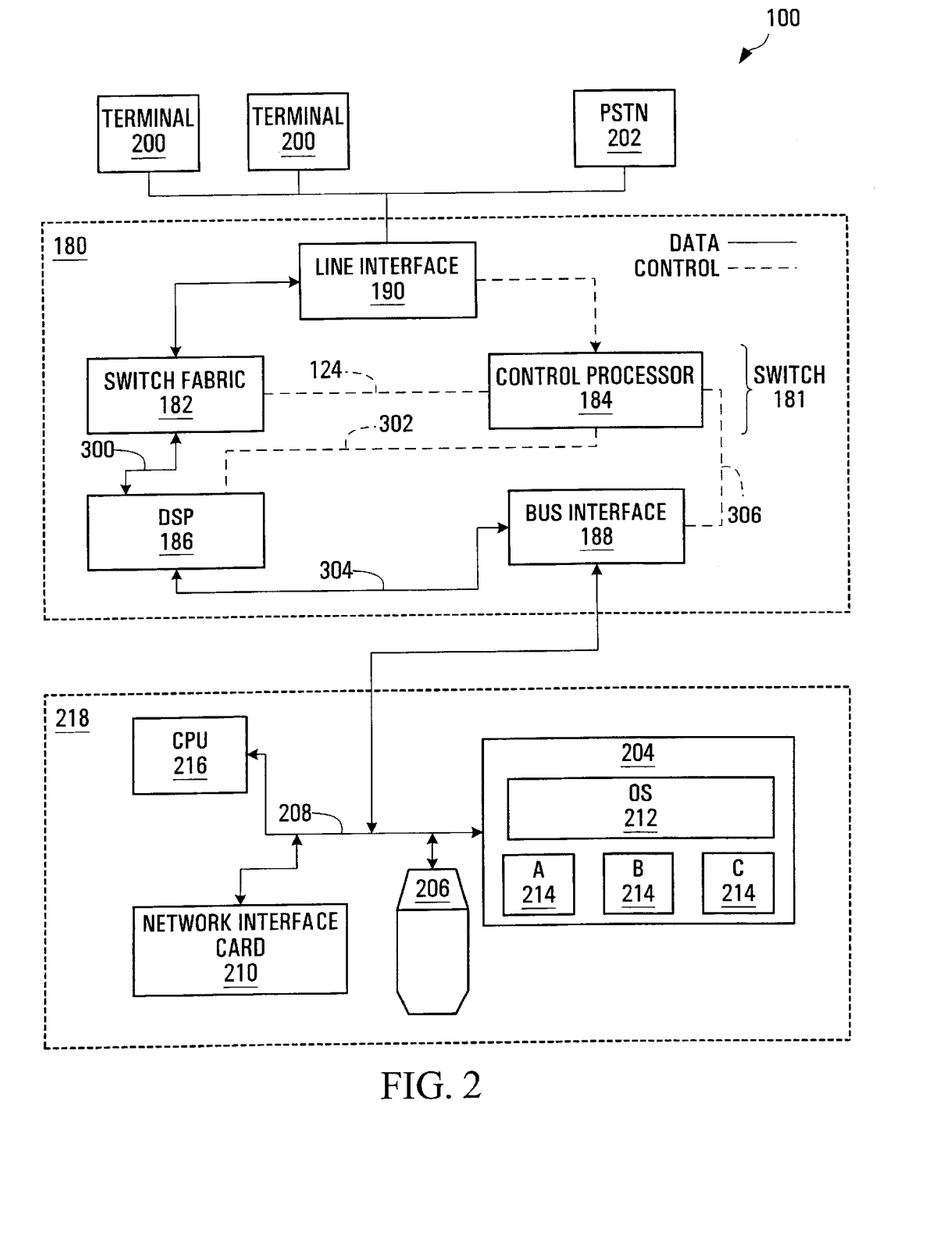
FIG. 2 is a block diagram partly functional and partly structural of the PBX telephone system illustrated in FIG. 1.

FIG. 2 provides a block diagram of the PBX telephone system 100 Note that the block 180 has a key for the communication paths of the units in that block—full lines illustrate data links while dashed lines illustrate control signal links. The adapter card 180 includes four main components namely a line interface 190, a switch 181, a digital signal processor (DSP) 186 and a bus interface 188 connecting with the bus of the server.

The line interface 190 establishes the physical connection between internal telephone sets 200 and the external world, in this example the PSTN 202. In the example shown, the line interface 190 connects to two telephone sets 200 and to a single external line that leads to the PSTN 202. It will be plain to a person skilled in the art that the number of lines to which the line interface 190 can connect is a matter of design choice and it is not critical to the operation of the invention.

The line interface 190 provides a bi-directional transmission medium for voice signals that could be in digital or analog form and also control signals between the lines and the switch 181. The switch 181 is a component that provides core telephony functions such as basic call routing and the associated call handling (for instance managing the placement of a call on hold) necessary to allow users to place calls internally and externally. In a specific example of operation, when one telephone set 200 wishes to establish a connection with another telephone set 200, the switch 181 will establish a connection path between the two internal lines allowing the audio signal to travel between the two telephone sets 200. The same function can also be performed between an internal telephone set 200 and a terminal point within the PSTN 202.

The switch 181 has two main components, namely a control processor or simply controller 184 and a switch fabric 182. The controller 184 receives control signals and implements the logic necessary to control the operation of the switch fabric 182 such as to provide the basic telephony functions. In addition it also incorporates logic to provide a level of control over the digital signal processor 186 that will be described later. The switch fabric 182 is merely a signal routing matrix that responds to control signals issued by the controller 184 over the control signal link 124 to direct a data signal such as an audio signal to the desired destination. In a specific example, the switch 181 is a timeswitch. Evidently, other types of switches can be used without departing from the spirit of the invention. It is not deemed necessary here to describe in further details the structure and the operation of the switch 181 since this component is well known to the person skilled in the art. In a specific example, a digital signal-processing hardware chip can be used as a platform to build the switch 181.

The switch 181 connects to the digital signal processor 186 that is in the form of a hardware chip capable of high-speed manipulations on an audio signal. A digital signal processor that has been found satisfactory is the one manufactured by Motorola in the DSP56XXX family products. More particularly, the digital signal processor 186 connects to the switch fabric 182 to receive over the data link 300 the audio signal on which the high-speed manipulations are to be performed. The digital signal processor 186 also connects to the controller 184 via control signal link 302 to receive control information, in particular which service or function provided by the digital signal processor 186 is to be applied on the audio signal. More specifically, the controller 184 indicates to the digital signal processor 186 through control signals over the control signal link 302 the kind of processing to be done on the audio signal, either voice encoding, voice decoding, speech recognition and other voice related processing operations.

As it is well known to those skilled in the art, a digital signal processor is capable of high-speed, real time data manipulations. The digital signal processor can be programmed to effect a wide variety of different operations on an input signal, either digital or analog. The digital signal processor 186 used in the apparatus 100 is programmed to perform and offer the following services, among many other possibilities:

1. Voice encoding/decoding;
2. Speech recognition;
3. Automated call distribution;
4. Integrated voice response (talk-back to user);
5. Text to speech conversion.

The data generated by the digital signal processor 186 as a result of the DSP processing is communicated to the bus interface 188 over the data link 304. The bus interface 188 constitutes the point of contact between the adapter card 180 and the computing apparatus 218. In addition to data signals, the bus interface also conveys control signals, in particular to and from the controller 184 over the control signal link 306.

The computing apparatus 218 is built on a general purpose computing platform and includes a CPU 216, a random access memory 204, a mass storage device 206 in the form of a hard-drive or flash memory, and a bus 208 interconnecting all these components and allowing data and control signals to be exchanged between them. Preferably, the bus is a PCI bus. A network interface adapter card 210 connects to the bus 208 and allows the computing apparatus to be connected to a network, such as a packet switched network, that can function according to different protocols. In this specific example, a packet switched network may be designed to operate under the Ethernet protocol, the TCP/IP protocol, token ring protocol or any other suitable type of protocol. The interface 188 of the adapter card 180 connects to the bus 208 and allows the exchange of control and data signal between the adapter card 180 and the computing apparatus 218.

The random access memory 204 holds in operation program elements that are executed by the CPU. The program elements fall in two categories namely an operating system 212 and a plurality of the call-related functional units that are executed by the CPU. The call-related functional units 214 provide call-related functions such greeting recording, speech recognition, and voice messaging among others. In a preferred embodiment, the operating system 212 is Windows NT (trademark) that allows the program elements 214 to run in a multitasking environment. This allows the program elements 214 to execute in parallel and also allows several instances of the same program element to exist, each instance being associated to a different call being set up or in progress through the switch 181. Although the block 204 (random access memory) shows a number of call-related functional units 214, it is to be understood that the memory 204 only holds the program elements or portions thereof associated to the call-related functions that are currently active. When a certain function is to be activated, the code is copied from the mass storage device 206 into the random access memory 204 where the CPU 216 can execute it.

Several examples of operation of the apparatus 100 will now be described to illustrate its functionality.

Figure 3:
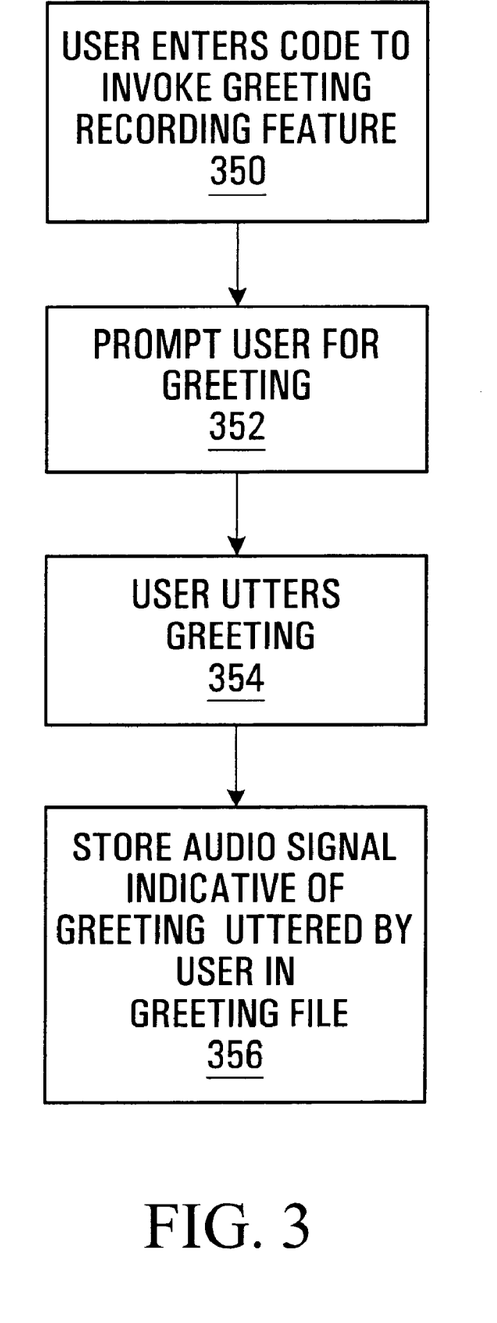
FIGS. 3 and 4 show flow diagrams of a process for generating a speech recognition dictionary in accordance with a non-limiting example of implementation of the invention.

The first example is a situation involving the recording of a greeting by a certain subscriber on a terminal 200 and is depicted in FIG. 3 of the drawings. At step 350, to invoke the greeting recording feature, the subscriber usually enters a specific code on the keypad of the terminal 200. The key code is recognised by the switch controller 184 as being a special key code and, as a result, the switch issues over the control signal link 306 and then through the interface 188 a control signal to the computing apparatus 218. The control signal invokes the program element 214 that performs the greeting recording. If the program element 214 performing the greeting recording is not yet active, its execution begins or if it is active, a new instance is created to serve this particular call.

At step 352, the first event during the execution of the greeting recording program element 214 is to deliver to the switch 184 a message that is played to the user to prompt the user to utter a greeting. In this example, the message is digitized and stored on the mass storage device 206. The greeting recording program element 214 then causes the audio file containing the message to be transmitted through the interface to the switch 181. The audio data is sent through the bus interface 188, over the digital link 306, is processed by the DSP 186, and then sent to the switch fabric 182 where it is directed to the telephone line so that the announcement will be played to the user. In one specific example, the audio file as delivered by the computing apparatus 218 is in a well-known encoded format. The processing of the digital signal processor 186 consists of decoding the encoded audio data into a format (for example a PCM format) such that when the signal is impressed on the line the user hears the announcement. As a variant, the audio file is stored in a format that is suitable to be impressed on the line to produce an audio realisation of the announcement. In a specific example of implementation, the G.711 PCM format is used for the audio file.

The function of the switch controller 184 is to direct the digital signal processor 186 to perform the proper service on the audio signal (decoding in the case of the playing of the message) and also to set the audio path through the switch fabric 182 such that the audio data released from the digital signal processor 186 will be delivered to the proper line. The controller 184 accomplishes this task by issuing the necessary control signals over the control signal links 302 and 124. The controller 184 also exchanges control signals with the greeting recording program element 214 over the control signal link 306 in order to synchronise the processing of the audio signal by the digital signal processor 186 and the ultimate disposition of the DSP processed signal (playing of the announcement) with the execution of the program element 214. In other words, the controller 184 makes available the DSP resource exactly when the program element 214 requires it.

After the announcement is played, the greeting recording program element 214 issues another control signal to the controller 184 indicating that it is now ready to receive data for processing In response to this control signal the controller 184 issues locally control signals over the control signal links 124 and 302 such that the connection path of the audio signal is directed to the digital signal processor 186 and the latter is set to provide a voice encoding service. At step 354, the subscriber utters the greeting and the audio signal generated by the microphone of the terminal 200 is transmitted by the switch fabric 182 to the digital signal processor 186. Preferably, the greeting consists essentially of the name of the subscriber, say for example "John Doe". In a specific example of implementation, this type of greeting can be used to generate an audio signal to be played to the caller of the type "[SUBSCRIBER NAME] is on the phone". At step 356, the digital signal processor 186 performs the voice encoding service that is to convert the audio signal that is in a PCM format into a more compact version. It is not deemed appropriate here to discuss in more detail how to perform voice encoding/decoding since such manipulations of an audio signal are well known to those skilled in the art. As a variant, the audio signal is stored without any encoding. In a specific example of implementation, the G.711 PCM format is used for the audio signal. Using the audio signal without encoding requires additional memory for storing the audio signal and allows an increase in the precision of a speech recognition process using the audio signal for speech recognition purposes The audio signal is then transferred to the computing apparatus 218 through the data link 304 and the bus interface 188 and then stored in the form of a file by the greeting recording program element 214 on the mass storage device 206. The file is associated with an identification number that is a unique identifier of the terminal at which the recording of the greeting has been effected.

A second example will now be provided in which a voice message is stored on the computing apparatus 218. This example assumes that the call originates in the PSTN and it is directed to one of the telephone sets 200. When the telephone set is not being answered after a pre-determined number of rings, the switch 184 issues a control signal causing activation of the voice message program element 214. The voice message program element 214 directs from the mass storage device 206, the file containing the greeting that is played by the switch 184 on the line notifying the caller that he or she Is entering into voice message. The playing of the greeting is performed in the same fashion as described earlier in connection with the greeting recording example. After the greeting is being played, the voice message program element 214 issues another control signal to the controller 184 and in response to this control signal the latter directs the audio path from the PSTN to the digital signal processor 186 and sets the digital signal processor 186 to perform a voice encoding service if applicable. The incoming audio data is then encoded into any suitable format and it is passed through the interface 188 for storage on the mass storage device 206 under the control of the voice message program element 214.

Figure 5:
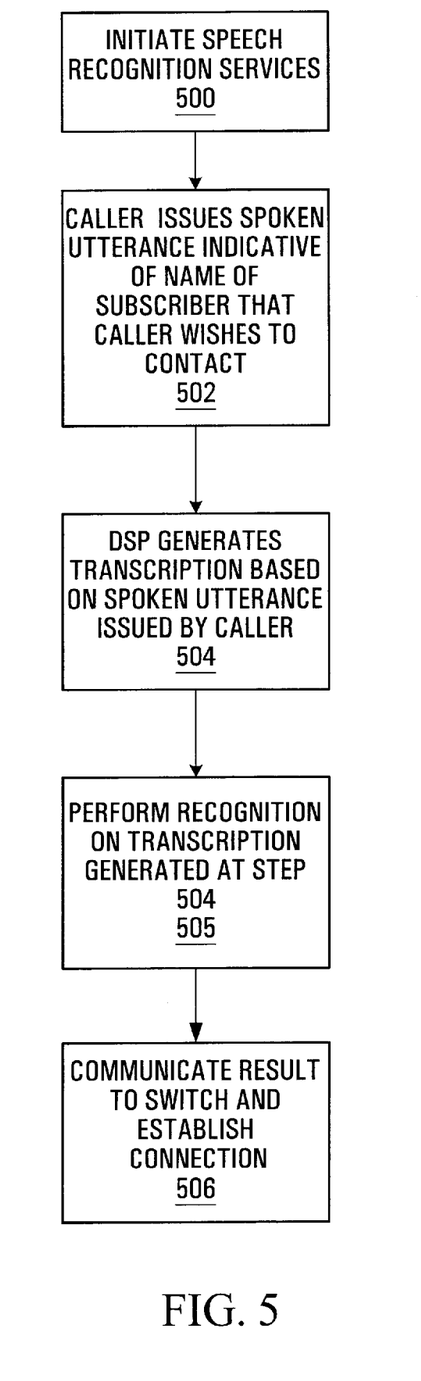
FIG. 5 shows a flow diagram of a process for establishing a connection on the basis of a speech recognition dictionary in accordance with a specific non-limiting example.

A third example will now be provided illustrating a situation of an incoming external call (a telephone call between and the PSTN 202 and an internal set 200) that requires speech recognition services. This type of service allows the calling party to utter the name of the subscriber he or she wishes to call and the PBX telephone system 100 will recognise the uttered name and effect the connection. As shown in FIG. 5, when the external call arrives, the switch 184 (after playing a suitable announcement to the calling party that invites the calling party to utter the name of the subscriber with whom he or she wishes to be connected) issues over the control signal link 306 and then through the interface 188, at step 500, a control signal to the computing apparatus 218 invoking the program element 214 that performs speech recognition services. If the program element 214 performing speech recognition services is not yet started, its execution begins or if it is started, a new instance is created to serve this particular call.

The speech recognition program element 214 issues a control signal to the controller 184 indicating that it is now ready to receive data for processing. In response to this control signal the controller 184 issues locally control signals over the control signal links 124 and 302 such that the connection path of the audio signal is directed to the digital signal processor 186 and the latter is set to provide a speech recognition service. At step 502, the calling party speaks the name of the subscriber that he or she wishes to call and that audio signal is transmitted by the switch fabric 182 to the digital signal processor 186. At step 504, the digital signal processor 186 performs the core speech recognition service that is to convert the spoken utterance into a transcription. That transcription is then transferred to the computing apparatus 218 through the data link 304 and the bus interface 188 such that the speech recognition program element 214 can process it at step 505. This processing involves comparing the transcription against a list of transcriptions associated to respective vocabulary items in a speech recognition dictionary to find the best possible match. The vocabulary items represent individual subscriber names. The list of transcriptions and associated vocabulary items is held in the mass storage device 206. When the best possible match is found, the identification number of the terminal 200 associated with that vocabulary item is extracted. At step 506, the extracted identification number is then communicated through the interface 188 to the switch 181. The latter then establishes a connection between the external call through the PSTN and the terminal corresponding to the identification number.

Figure 4:
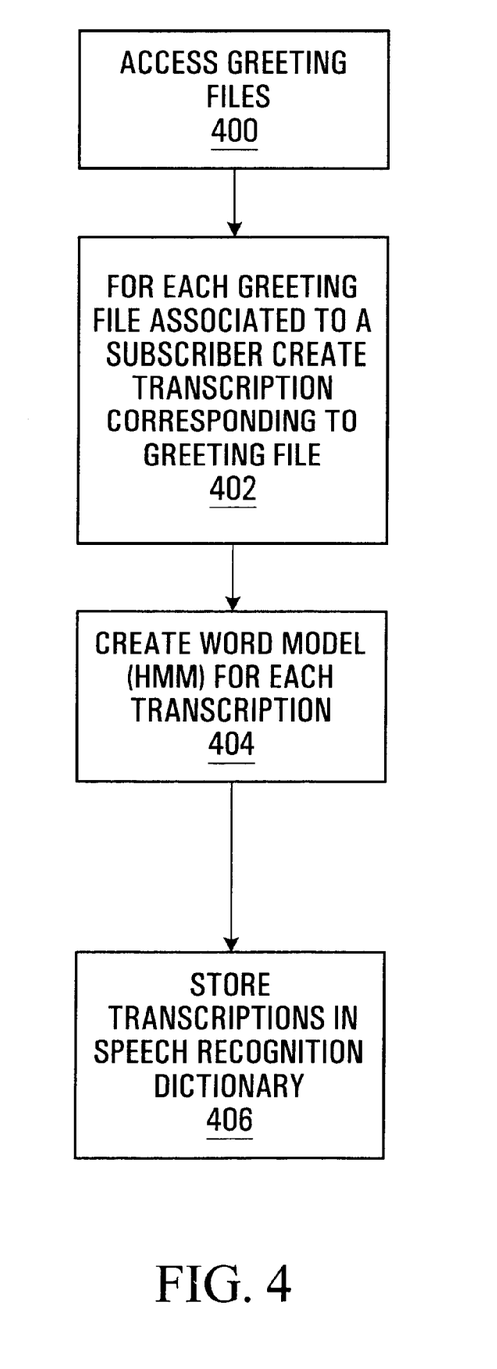

A fourth example illustrates a situation during which the individual greetings stored on the mass storage device 206 (generated by the process described in connection with FIG. 3) are processed to generate the speech recognition dictionary that is used by the speech recognition program element 214 described earlier. The generation of the speech recognition dictionary is preferably performed during periods of time during which the PBX telephone system is not too busy, such as at night or during weekends. As shown in FIG. 4, when the program element 214 that generates the speech recognition dictionary is invoked, the program element 214 fetches at step 400 the individual greeting files (by exchanging the necessary control signals with the switch 181) through the DSP 186, to create, at step 402, a transcription associated to each file that represents the name of a subscriber. In a specific example of implementation, each transcription is associated to a respective vocabulary item indicative of the name of the subscriber. The resulting data is then transferred to the memory 204 for further processing by the program element 214. This further processing involves at step 404 creating for each transcription associated to a greeting a corresponding Hidden Markov Model constituting a representation of the pronunciation of the subscriber name. As a variant, a mapping between the sub-word units continuing the transcriptions and Hidden Markov Models in a set of models is provided allowing a single copy of the Hidden Markov Models to be stored whereby reducing the memory requirement of the system. It is not deemed necessary to provide further details of the processing since it is well known in the art to generate transcriptions for use in a speech recognition dictionary based on speech tokens, which in this case are the greetings As a variant the speech recognition dictionary further comprises for a subset of the vocabulary items associated to respective subscriber names, transcriptions derived on a basis of the orthographic representation of the subscriber name. In this variant, a vocabulary item is associated to at least one transcription derived from the greeting message and to at least one transcription derived from the orthographic representation of the subscriber name. The transcription derived from the orthographic representation of the subscriber name may be derived by a text to phoneme processing apparatus or other well-know devices The speech recognition dictionary generation program element 214 thus generates from each greeting a transcription associated to a vocabulary item representative of the name of the subscriber. At step 406, the transcriptions are stored in a table that is used by the speech recognition program element 214 when the speech recognition services are utilized, as described earlier. Preferably, a vocabulary item associated to respective transcriptions is also stored in the table. In association with each vocabulary item in the table is also stored the identification number of the terminal 200 associated with the corresponding subscriber name. This allows the speech recognition program element 214 to know toward which terminal 200 to direct an incoming call when it selects a certain vocabulary item as the best match to the spoken utterance. The identification numbers of the terminals are available as they are carried during the processing form the source greeting files.

Although the present invention has been described in considerable detail with reference to certain preferred embodiments thereof, variations and refinements are possible without departing from the spirit of the invention as have been described throughout the document. Therefore, only the appended claims and their equivalents should limit the scope of the invention.

We claim:

1. A system to generate a speech recognition dictionary, said system comprising:
   a) an input for receiving a signal derived from audio greetings recorded by telephone system subscribers that are audibly played by the telephone system prior to allowing callers to leave voice messages to the telephone system subscribers, each greeting being indicative of a name of a subscriber of the telephone system; and
   b) a processing unit coupled to said input for processing the signal to generate a speech recognition dictionary, said speech recognition dictionary including vocabulary items representative of the names of the subscribers indicative by the greetings, said speech recognition dictionary being suitable for processing by a speech recognition system attempting to match a spoken utterance against a vocabulary item of said speech recognition dictionary.

2. A system as defined in claim 1, wherein said processing unit is operative to process the greetings to generate transcriptions representative of the names of the subscribers in the respective greetings.

3. A system as defined in claim 2, wherein said processing unit is operative to process the transcriptions representative of the names of the subscribers in the respective greetings to derive corresponding Hidden Markov Models of the names of the subscribers.

4. A system as defined in claim 2, wherein the transcriptions representative of the names of the subscribers in the respective greetings are transcriptions of a first type, said processing unit being further operative to process an orthographic representation of a vocabulary item associated to the name of a subscriber to derive a transcription of a second type.

5. A method for generating a speech recognition dictionary, comprising:
   a) receiving a signal derived from audio greetings recorded by telephone system subscribers that are audibly played by the telephone system prior to allowing callers to leave voice messages to the telephone system subscribers, each greeting being indicative of a name of a subscriber of the telephone system; and
   b) processing the signal to generate a speech recognition dictionary, said speech recognition dictionary including vocabulary items representative of the names of the subscribers indicative by the greetings, said speech recognition dictionary being suitable for processing by a speech recognition system attempting to match a spoken utterance against a vocabulary item of said speech recognition dictionary.

6. A method as defined in claim 5, further comprising processing the greetings to generate transcriptions representative of the names of the subscribers in the respective greetings.

7. A method as defined in claim 6, further comprising processing the transcriptions representative of the names of the subscribers in the respective greetings to derive corresponding Hidden Markov Models of the names of the subscribers.

8. A method as defined in claim 5, wherein the transcriptions representative of the names of the subscribers in the respective greetings are transcriptions of a first type, said method further comprising processing an orthographic representation of a vocabulary item associated to the name of a subscriber to derive a transcription of a second type.

9. A system to generate a speech recognition dictionary, said system comprising:
   a) input means for receiving a signal derived from audio greetings recorded by telephone system subscribers that are audibly played by the telephone system prior to allowing callers to leave voice messages to the telephone system subscribers, each greeting being indicative of a name of a subscriber of the telephone system; and
   b) processing means for processing the signal to generate a speech recognition dictionary, said speech recognition dictionary including vocabulary items representative of the names of the subscribers indicative by the greetings, said speech recognition dictionary being suitable for processing by a speech recognition system attempting to match a spoken utterance against a vocabulary item of said speech recognition dictionary.

10. A telephone system with voice messaging capability, comprising:
   a) a machine readable storage medium for storing greetings, each greeting being associated with a voice mailbox of a subscriber and being played prior to allowing a caller to a leave a voice messages to the telephone system subscriber;
   b) a processing unit coupled to said machine readable storage medium for processing the signal to generate a speech recognition dictionary, said speech recognition dictionary including vocabulary items representative of the names of the subscribers indicative by the greetings, said speech recognition dictionary being suitable for processing by a speech recognition system attempting to match a spoken utterance against a vocabulary item of said speech recognition dictionary;
   c) a voice messaging unit coupled to said machine readable storage medium operative for audibly playing a greeting when a condition exists indicative of an attempt of a caller to leave a message in a voice mail box of a subscriber.

11. A telephone system as defined in claim 10, comprising a speech recognition unit responsive to a signal derived from a spoken utterance by a caller to process said speech recognition dictionary to derive a vocabulary item that potentially matches the spoken utterance.

12. A telephone system as defined in claim 11, wherein said speech recognition unit is operative to cause establishment of a call connection between the caller and a subscriber of the telephone system associated with the vocabulary item derived as being a potential match to the spoken utterance.

13. A telephone system as defined in claim 10, wherein said processing unit is operative to process the greetings to generate transcriptions representative of the names of the subscribers in the respective greetings.

14. A telephone system as defined in claim 13, wherein said processing unit is operative to process the transcription representative of the names of the subscribers in the respective greetings to derive corresponding Hidden Markov Models of the names of the subscribers.

15. A telephone as defined in claim 13, wherein the transcriptions representative of the names of the subscribers in the respective greetings are transcriptions of a first type, said processing unit being further operative to process an orthographic representation of a vocabulary item associated to the name of a subscriber to derive a transcription of a second type.

16. A telephone system as defined in claim 10, wherein said telephone system is a PBX.

* * * * *